US012098503B2

(12) United States Patent
Chen et al.

(10) Patent No.: US 12,098,503 B2
(45) Date of Patent: Sep. 24, 2024

(54) COATING COMPOSITION AND ITS USES

(71) Applicants: DOW SILICONES CORPORATION, Midland, MI (US); DOW GLOBAL TECHNOLOGIES LLC, Midland, MI (US)

(72) Inventors: Yusheng Chen, Shanghai (CN); Lili Shi, Shanghai (CN); Zhihai Zhang, Shanghai (CN); Rui Wang, Shanghai (CN); Yi Guo, Shanghai (CN); Wengang Song, Shanghai (CN); Linfei Wang, Shanghai (CN)

(73) Assignees: DOW SILICONES CORPORATION, Midland, MI (US); DOW GLOBAL TECHNOLOGIES LLC, Midland, MI (US)

(*) Notice: Subject to any disclaimer, the term of this patent is extended or adjusted under 35 U.S.C. 154(b) by 321 days.

(21) Appl. No.: 17/610,739

(22) PCT Filed: Apr. 9, 2020

(86) PCT No.: PCT/CN2020/083881
§ 371 (c)(1),
(2) Date: Nov. 12, 2021

(87) PCT Pub. No.: WO2020/233268
PCT Pub. Date: Nov. 26, 2020

(65) Prior Publication Data
US 2022/0064853 A1 Mar. 3, 2022

(30) Foreign Application Priority Data
May 17, 2019 (WO) ............... PCT/CN2019/087377

(51) Int. Cl.
| | |
|---|---|
| *D06N 3/12* | (2006.01) |
| *C09D 7/20* | (2018.01) |
| *C09D 183/04* | (2006.01) |
| *D06N 3/00* | (2006.01) |
| *C08G 77/12* | (2006.01) |
| *C08G 77/20* | (2006.01) |

(52) U.S. Cl.
CPC ............. *D06N 3/128* (2013.01); *C09D 7/20* (2018.01); *C09D 183/04* (2013.01); *D06N 3/0061* (2013.01); *D06N 3/0095* (2013.01); *D06N 3/0097* (2013.01); *C08G 77/12* (2013.01); *C08G 77/20* (2013.01); *D06N 2209/105* (2013.01); *D06N 2211/14* (2013.01); *D06N 2211/28* (2013.01)

(58) Field of Classification Search
CPC ..................................................... C08L 83/04
See application file for complete search history.

(56) References Cited

U.S. PATENT DOCUMENTS

| | | |
|---|---|---|
| 3,419,593 A | 12/1968 | Willing |
| 3,715,334 A | 2/1973 | Karstedt |
| 3,814,730 A | 6/1974 | Karstedt |
| 3,989,667 A | 11/1976 | Lee et al. |
| 6,605,734 B2 | 8/2003 | Roy et al. |
| 2010/0012902 A1 | 1/2010 | Rapson |
| 2010/0055334 A1 | 3/2010 | Kim |
| 2012/0164336 A1 | 6/2012 | Maliverney |
| 2017/0044338 A1 | 2/2017 | Feder et al. |
| 2018/0355552 A1 | 12/2018 | Hung et al. |
| 2019/0390084 A1* | 12/2019 | Fan .................. C08L 83/04 |

FOREIGN PATENT DOCUMENTS

| | | | |
|---|---|---|---|
| CN | 1372610 A | 10/2002 | |
| CN | 1702234 A | 11/2005 | |
| CN | 1968805 A | 5/2007 | |
| CN | 101432366 A | 5/2009 | |
| CN | 101479342 A | 7/2009 | |
| CN | 102803414 A | 11/2012 | |
| CN | 205688265 U | 11/2016 | |
| CN | 106498759 A | 3/2017 | |
| CN | 106687542 A | 5/2017 | |
| CN | 107000394 A | 8/2017 | |
| CN | 107323020 A | 11/2017 | |
| CN | 108221398 A | 6/2018 | |
| CN | 112280529 A * | 2/2021 | ............ C08G 77/44 |
| WO | 2018119582 A1 | 7/2018 | |
| WO | 2019014403 A1 | 1/2019 | |
| WO | 2019056347 A1 | 3/2019 | |
| WO | 2020233268 A1 | 11/2020 | |

OTHER PUBLICATIONS

Machine translation of CN 112280529 (no date).*
"Eco-Compatible Solvent-Processed Organic Photovoltaic Cells with over 16% Efficiency" authored by Hong et al., and published i Advanced Materials (2019) 31, 1903441.*
"Organosilicone Compounds in Supercritical Carbon Dioxide" authored by Sizov et al., and published in Polymers (2022) 14, 2367.*
International Search Report for PCT/CN2021/141886 dated May 9, 2022, 3 pages.
Machine assisted translation of CN205688265U, obtained from https://patents.google.com on Jun. 28, 2023, 7 pages.
International Search Report for PCT/CN2020/083881 dated Jul. 1, 2020, 6 pages.

(Continued)

Primary Examiner — Marc S Zimmer
(74) Attorney, Agent, or Firm — WARNER NORCROSS + JUDD LLP

(57) ABSTRACT

The present disclosure relates to a silicone elastomeric coating composition for synthetic leather, particularly silicone-based synthetic leather, a silicone elastomeric coating (e.g., a topcoat) formed as a reaction product of the cure of the coating composition, methods of making the topcoat and synthetic leather utilizing the same and uses of synthetic leather products. The topcoat is designed to provide synthetic leather with an improved abrasion and scratch resistant topcoat.

14 Claims, 2 Drawing Sheets

(56) References Cited

OTHER PUBLICATIONS

Machine assisted English translation of CN1702234A obtained from https://patents.google.com/patent on Nov. 4, 2021, 7 pages.
Machine assisted English translation of CN107323020A obtained from https://patents.google.com/patent on Nov. 4, 2021, 10 pages.
Machine assisted English translation of CN108221398A obtained from https://patents.google.com/patent on Nov. 4, 2021, 11 pages.
International Search Report for PCT/CN2019/087377 dated Feb. 26, 2020, 6 pages.
Machine assisted translation of CN1968805A, obtained from https://patents.google.com/ on Oct. 4, 2022, 33 pgs.
Machine assisted translation of CN106498759A, obtained from https://patents.google.com/ on Oct. 4, 2022, 15 pgs.

* cited by examiner

COATING COMPOSITION AND ITS USES

CROSS-REFERENCE TO RELATED APPLICATIONS

This application is the U.S. National Stage of International Application No. PCT/CN2020/083881 filed on 9 Apr. 2020, which claims priority to and all advantages of Application No. PCT/CN2019/087377 filed on 17 May 2019, the contents of which is incorporated herein by reference.

TECHNICAL FIELD

The present disclosure relates to a silicone elastomeric coating composition for synthetic leather, particularly silicone-based synthetic leather, a silicone elastomeric coating formed as a reaction product of the cure of the composition, methods of making the topcoat and synthetic leather utilizing same and uses of said synthetic leather products. The topcoat is designed to provide synthetic leather with an improved abrasion and scratch resistant topcoat.

BACKGROUND

A variety of synthetic alternatives to natural leather have been developed with polyurethane (PU) or polyvinylchloride (PVC) based materials having been mainly used. They are used in a wide variety of applications including for furniture, decoration, handbags, luggage, garments, footwear, car interiors, and the like. However, to meet increasingly strict safety regulations, to be utilised as synthetic leather, they need to meet stringent physical property requirements, regarding e.g. flame retardancy, smoke density, suitable adhesion strength in order to allow a coating layer not to be peeled off at the time of usage, heat resistance, contamination resistance, solvent resistance, hydrolysis resistance, and the like, are required. Often the PU and/or PVC based materials cannot satisfy the above-mentioned physical properties.

Silicone-based synthetic leather composite materials are able to outperform conventional PU and PVC synthetic leather, from a physical property perspective because of the ability to provide for example, better flexibility over a broad temperature range as well as excellent UV & thermal resistance. Furthermore, silicone-based synthetic leather materials are generally considered to be skin friendly.

Another advantage of silicone-based synthetic leather composite materials over organic alternatives is that they can generally be prepared using more eco-friendly production methods, given the manufacture of organic synthetic leather relies on the use of environmentally problematic solvents such as dimethylformamide (DMF) which often remains, at least partially, in the synthetic leather product post manufacture.

Silicone-based synthetic leather may be made via several routes but is generally manufactured using a textile support layer and two or more layers of hydrosilylation curable liquid silicone rubber compositions and a release paper. For example, a first liquid silicone rubber (LSR) composition may be coated onto a release paper and is then cured to form a first or skin layer. A second LSR composition, usually having different physical properties to that of the first, is applied over the cured first layer to form an adhesion layer and then a textile support layer is placed onto the second LSR layer prior to cure, after which the second LSR composition is cured to form an adhesive layer situated between the skin layer and the textile support layer. The release paper is subsequently removed as and when required. One or more additional layers, of the same or different LSR compositions may also be applied between the release paper and the textile layer as deemed appropriate to form a silicone-based leather composite material. For example, a third layer may be provided as a protective topcoat on top of the skin layer.

While such resulting products have been used very successfully as silicone-based synthetic leathers (once the release paper has been removed), a problem has been identified in that the skin layer and/or previous topcoat layers have not provided sufficient abrasion resistance (e.g. a Wyzenbeek abrasion resistance of greater than or equal to (≥) 75,000, alternatively, greater than or equal to (≥) 100,000 times test), as well as suitable scratch resistance i.e. no white line or crack after strong nail scratching and no visually noticeable discolouration (e.g. whitening) caused by stretching the synthetic leather. Hence, there remains a need for an improved topcoat which is able to address these issues.

SUMMARY

There is provided a leather coating composition comprising a hydrosilylation curable silicone elastomer composition containing Component (i), one or more polydiorganosiloxane polymer(s) having a viscosity of from 1000 to 500,000 mPa·s at 25° C. and an alkenyl group and/or alkynyl group content of at least 5% by weight of the polymer(s) per molecule Component (ii) a reinforcing filler such as finely divided silica optionally treated with one or more known filler treating agents;

Component (iii) a silicone resin cross-linker having terminal (M) groups comprising silicone bonded hydrogen;

Component (iv) a hydrosilylation catalyst;

Component (v) a cured silicone powder and

Component (vi) an eco-diluent.

DETAILED DESCRIPTION

The leather coating composition is particularly suited as a topcoat for a synthetic leather, particularly silicone-based synthetic leathers.

Component (i) of the hydrosilylation curable silicone elastomer composition of the leather coating composition is one or more polydiorganosiloxane polymer(s) having a viscosity of from 1000 to 500,000 mPa·s at 25° C. and an alkenyl group and/or alkynyl group content of at least 5% by weight of the polymer(s) per molecule;

e.g. Polydiorganosiloxane polymer (i) has multiple groups of the formula (I):

$$R_a SiO_{(4-a)/2} \qquad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Siloxy groups may be described by a shorthand (abbreviated) nomenclature, namely—"M," "D," "T," and "Q", when R is an organic group, typically methyl group (further teaching on silicone nomenclature may be found in Walter Noll, Chemistry and Technology of Silicones, dated 1962, Chapter I, pages 1-9). The M group corresponds to a siloxy group where a=3, that is $R_3SiO_{1/2}$; the D group corresponds to a siloxy group where a=2, namely $R_2SiO_{2/2}$; the T group corresponds to a siloxy group where a=1, namely $R_1SiO_{3/2}$; the Q group corresponds to a siloxy group where a=0, namely $SiO_{4/2}$.

Examples of typical groups on the polydiorganosiloxane polymer (i) include mainly alkenyl, alkyl, and/or aryl groups. The groups may be in pendent position (on a D or T siloxy group) or may be terminal (on an M siloxy group). Hence, suitable alkenyl groups in polydiorganosiloxane polymer (i) typically contain from 2 to 10 carbon atoms, e.g. vinyl, isopropenyl, allyl, and 5-hexenyl, typically vinyl groups and as previously indicated are present on the polymer in an amount of at least 5% by weight of the polymer(s) per molecule, alternatively from 5 to 15% by weight of the polymer(s) per molecule, alternatively from 6 to 15% by weight of the polymer(s) per molecule, alternatively from 7 to 15% by weight of the polymer(s) per molecule which may be determined using quantitative infrared analysis in accordance with ASTM E168.

The silicon-bonded organic groups attached to polydiorganosiloxane polymer (i) other than alkenyl groups and/or alkynyl groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with groups that do not interfere with curing of this inventive composition, such as halogen atoms. Preferred species of the silicon-bonded organic groups are, for example, alkyl groups such as methyl, ethyl, and propyl; and aryl groups such as phenyl.

The molecular structure of polydiorganosiloxane polymer (i) is typically linear, however, there can be some branching due to the presence of T groups (as previously described) within the molecule.

To achieve a useful level of physical properties in the elastomer prepared by curing the composition as hereinbefore described, the viscosity of polydiorganosiloxane polymer (i) should be at least 1000 mPa·s at 25° C. The upper limit for the viscosity of polydiorganosiloxane polymer (i) is limited to a viscosity of up to 500,000 mPa·s at 25° C.

Generally, the or each polydiorganosiloxane containing alkenyl groups and/or alkynyl groups in an amount of at least 5% by weight of the polymer(s) per molecule (determined using quantitative infra-red analysis in accordance with ASTM E168) of component (i) has a viscosity of from 1000 mPa·s to 150,000 mPa·s at 25° C., alternatively from 2000 mPa·s to 125,000 mPa·s at 25° C., alternatively from 2000 mPa·s to 100,000 mPa·s at 25° C. alternatively from 5000 mPa·s to 80,000 mPa·s measured at 25° C. relying on the cup/spindle method of ASTM D1084-16 Method B, using an appropriate spindle for the viscosity range unless otherwise indicated.

The polydiorganosiloxane polymer (i) may be selected from polydimethylsiloxanes, alkylmethylpolysiloxanes, alkylarylpolysiloxanes or copolymers thereof containing e.g. alkenyl and/or alkynyl groups and may have any suitable terminal groups, for example, they may be trialkyl terminated, alkenyldialkyl terminated or may be terminated with any other suitable terminal group combination providing each polymer contains at least 5% by weight of the polymer(s) per molecule which may be determined using quantitative infra-red analysis in accordance with ASTM E168.

Hence the Polydiorganosiloxane polymer (i) may be, for the sake of example, dimethylvinyl terminated polydimethylsiloxane, dimethylvinyl terminated dimethylmethylphenylsiloxane, trialkyl terminated dimethylmethylvinyl polysiloxane or dialkylvinyl terminated dimethylmethylvinyl polysiloxane copolymers, although given the high level of alkenyl and/or alkynyl groups present alternatively trialkyl terminated dimethylmethylvinyl polysiloxane or dialkylvinyl terminated dimethylmethylvinyl polysiloxane copolymers.

For example, a polydiorganosiloxane polymer (i) containing alkenyl groups and/or alkynyl groups at the two terminals may be represented by the general formula (II):

R'R"R'"SiO—(R"R'"SiO)$_m$—SiOR'"R"R'     (II)

In formula (II), each R' may be an alkenyl group or an alkynyl group, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl, an alkenylated cyclohexyl group, heptynyl, octynyl, nonynyl, decynyl or similar linear and branched alkenyl groups and alkenylated aromatic ringed structures.

R" does not contain ethylenic unsaturation, Each R" may be the same or different and is individually selected from monovalent saturated hydrocarbon group, which typically contain from 1 to 10 carbon atoms, and monovalent aromatic hydrocarbon group, which typically contain from 6 to 12 carbon atoms. R" may be unsubstituted or substituted with one or more groups that do not interfere with curing of this inventive composition, such as halogen atoms. R'" is R' or R".

Organopolysiloxane polymer (i), is typically present in an amount of from 3, alternatively 10 wt. % of the composition, to 30 wt. %, alternatively 25 wt. % of the composition, for example organopolysiloxane polymer (i) may be present in a range of from 10 to 30 wt. %, alternatively from 10 to 25 wt. %.

(ii) Reinforcing Filler

Component (ii) of the leather coating composition comprising a hydrosilylation curable silicone elastomer composition is a reinforcing filler such as finely divided silica. Silica and other reinforcing fillers (ii) are often treated with one or more known filler treating agents to prevent a phenomenon referred to as "creping" or "crepe hardening" during processing of the curable composition.

Finely divided forms of silica are preferred reinforcing fillers (ii). Precipitated and/or fumed silicas, alternatively fumed silica is/are particularly preferred because of their relatively high surface area, which is typically at least 50 m²/g (BET method in accordance with ISO 9277:2010). Fillers having surface areas of from 50 to 450 m²/g (BET method in accordance with ISO 9277:2010), alternatively of from 50 to 300 m²/g (BET method in accordance with ISO 9277:2010), are typically used. Both types of silica are commercially available.

The amount of reinforcing filler (ii) e.g. finely divided silica in the composition herein is from 5 to 40% wt, alternatively of from 5 to 30% wt. In some instances, the amount of reinforcing filler may be of from 7.5 to 30% wt., alternatively from 10 to 30% wt. based on the weight of the composition, alternatively from 15 to 30% wt. based on the weight of the composition.

When reinforcing filler (ii) is naturally hydrophilic (e.g. untreated silica fillers), it is typically treated with a treating agent to render it hydrophobic. These surface modified reinforcing fillers (ii) do not clump and can be homogeneously incorporated into polydiorganosiloxane polymer (i) as the surface treatment makes the fillers easily wetted by polydiorganosiloxane polymer (i). This results in improved room temperature mechanical properties of the compositions and resulting cured materials cured therefrom.

The surface treatment may be undertaken prior to introduction in the composition or in situ (i.e. in the presence of at least a portion of the other components of the composition herein by blending these components together at room temperature or above until the filler is completely treated. Typically, untreated reinforcing filler (ii) is treated in situ with a treating agent in the presence of polydiorganosiloxane polymer (i), whereafter mixing a silicone rubber base material is obtained, to which other components may be added.

Typically reinforcing filler (ii) may be surface treated with any low molecular weight organosilicon compounds disclosed in the art applicable to prevent creping of organosiloxane compositions during processing. For example, organosilanes, polydiorganosiloxanes, or organosilazanes e.g. hexalkyl disilazane, short chain siloxane diols or fatty acids or fatty acid esters such as stearates to render the filler(s) hydrophobic and therefore easier to handle and obtain a homogeneous mixture with the other components. Specific examples include but are not restricted to silanol terminated trifluoropropylmethyl siloxane, silanol terminated ViMe siloxane, tetramethyldi(trifluoropropyl)disilazane, tetramethyldivinyl disilazane, silanol terminated MePh siloxane, liquid hydroxyl-terminated polydiorganosiloxane containing an average from 2 to 20 repeating groups of diorganosiloxane in each molecule, hexaorganodisiloxane, hexaorganodisilazane. A small amount of water can be added together with the silica treating agent(s) as processing aid.

The filler may be introduced into the composition in the form of a masterbatch or base comprising said filler and an organopolysiloxane polymer. The organopolysiloxane polymer used for the masterbatch or base may be component (i) but alternatively may be an organopolysiloxane polymer having a viscosity in the same range as component (i) but having an alkenyl and/or alkynyl content of <5% by weight of the polymer. If required, the fumed silica may be hydrophobically treated in situ during the preparation of the masterbatch by the introduction of suitable hydrophobing agents into the mixture.

The composition as described herein is cured using a hydrosilylation cure package comprising an organohydrogenpolysiloxane having 3 or more silicon-bonded hydrogen atoms per molecule (Component iii) and a hydrosilylation catalyst (component iv).

Component (iii) Organohydrogenpolysiloxane

Component (iii) of the leather coating composition comprising the hydrosilylation curable silicone elastomer composition is a silicone resin cross-linker having terminal groups comprising silicone bonded hydrogen, which operates as a cross-linker for polymer (i), by the addition reaction of the silicon-bonded hydrogen atoms in component (iii) with the alkenyl groups and/or alkynyl groups in component (i) under the catalytic activity of component (iv) to be mentioned below. Component (iii) contains at least 5,000 parts per million (ppm) of silicon bonded hydrogen (Si—H), alternatively at least 7000 ppm, alternatively from 7000 to 12,000 ppm of silicon bonded hydrogen, alternatively 8000 ppm to 11,000 ppm of silicon bonded hydrogen so that the silicon bonded hydrogen atoms of this component can sufficiently react with the alkenyl groups and/or alkynyl groups, typically alkenyl groups, especially vinyl groups of component (i) to form a network structure therewith and thereby cure the composition. The quantity of silicon bonded hydrogen present is also determined using quantitative infrared analysis in accordance with ASTM E168.

The molecular configuration of component (iii) is resinous, comprising a mixture of Q, T, D and M groups and has a viscosity of from 10 to 5000 mPa·s at 25° C., alternatively 10 to 1000 mPa·s at 25° C., alternatively 10 to 500 mPa·s at 25° C. using a using a Brookfield DV 3T Rheometer to obtain a good miscibility with component (i).

Examples of component (iii) of the leather coating composition comprising the hydrosilylation curable silicone elastomer composition include but are not limited to:
  silicone resins comprising or consisting of Si—H containing M groups such as $(CH_3)_2$ $HSiO_{1/2}$ groups, trialkyl M groups such as $(CH_3)_3SiO_{1/2}$ groups and $SiO_{4/2}$ groups,
    silicone resins comprising or consisting of Si—H containing M groups such as $(CH_3)_2HSiO_{1/2}$ groups and $SiO_{4/2}$ groups,
  silicone resins comprising or consisting of Si—H containing M groups such as $(CH_3)_2HSiO_{1/2}$ groups, $(CH_3)_2SiO_{2/2}$ groups and $SiO_{4/2}$ groups,
    silicone resins comprising or consisting of Si—H containing M groups such as $(CH_3)_2HSiO_{1/2}$ groups, $SiO_{4/2}$ groups and $(C_6H_5)_3SiO_{1/2}$ groups, and alternatives in which methyl is replaced by
  phenyl groups or other alkyl groups or mixtures thereof. The silicone resins may also comprise T groups and/or D groups, alternatively T groups.
  Optionally, other cross-linkers may additionally be utilised. These may include
  1,1,3,3-tetramethyldisiloxane,
  1,3,5,7-tetramethylcyclotetrasiloxane,
  tris(hydrogendimethylsiloxy)methylsilane,
  tris(hydrogendimethylsiloxy)phenylsilane, methylhydrogencyclopolysiloxane,
  trimethylsiloxy-end-blocked methylhydrogenpolysiloxane,
  trimethylsiloxy-end-blocked dimethylsiloxane/methylhydrogensiloxane copolymers,
  dimethylhydrogensiloxy-end-blocked dimethylpolysiloxane,
  dimethylhydrogensiloxy-end-blocked dimethylsiloxane/methylhydrogensiloxane copolymers,
  trimethylsiloxy-end-blocked methylhydrogensiloxane/diphenylsiloxane copolymers,
  trimethylsiloxy-end-blocked methylhydrogensiloxane/diphenylsiloxane/-dimethylsiloxane copolymers, trimethylsiloxy-end-blocked methylhydrogensiloxane/methylphenylsiloxane/-dimethylsiloxane copolymers, dimethylhydrogensiloxy-end-blocked/dimethylsiloxane/-diphenylsiloxane copolymers and/or dimethylhydrogensiloxy-end-blocked methylhydrogensiloxane/dimethylsiloxane/-methylphenylsiloxane copolymers. However, it is preferred that component (iii) is one or more silicone resin as described above.

Component (iii) is typically present in the total composition in an amount of from 5 to 20 weight %, alternatively from 10 to 20 weight % by weight of the composition but the amount present is typically determined by the molar ratio of the silicon-bonded hydrogen atoms in component (iii) to the total number of all unsaturated groups, e.g. alkenyl and alkynyl groups, often vinyl groups. In the present composition the molar ratio of the silicon-bonded hydrogen atoms in component (iii) to the total number of all unsaturated groups is from 0.5:1 to 20:1, alternatively from 0.5:1 to 10:1, alternatively from 0.5:1 to 5:1, alternatively from 1:1 to 5:1 preferably with Si—H being in excess.

iv) Hydrosilylation Catalyst

As hereinbefore described the leather coating composition is cured via a hydrosilylation (addition) reaction catalysed by a hydrosilylation (addition cure) catalyst (iv) that is a metal selected from the platinum metals, i.e. platinum, ruthenium, osmium, rhodium, iridium and palladium, or a compound of such metals. Platinum and rhodium compounds are preferred due to the high activity level of these catalysts for hydrosilylation reactions.

The catalyst (iv) can be platinum metal, platinum metal deposited on a carrier, such as silica gel or powdered charcoal, or a compound or complex of a platinum group metal. Example of preferred hydrosilylation catalysts (iv) for the hydrosilylation curable silicone elastomer composition of the leather coating composition include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups.

Examples of suitable platinum-based catalysts (iv) include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(iv) alkene-platinum-silyl complexes as described in U.S. Pat. No. 6,605,734 such as (COD)Pt(SiMeCl$_2$)$_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (iv) is present in the total composition in a catalytic amount, i.e., an amount or quantity sufficient to promote a reaction or curing thereof at desired conditions. Varying levels of the hydrosilylation catalyst (iv) can be used to tailor reaction rate and cure kinetics. The catalytic amount of the hydrosilylation catalyst (iv) is generally between 0.01 ppm, and 10,000 parts by weight of platinum-group metal, per million parts (ppm), based on the combined weight of the components (i) and (ii) and (v) when present; alternatively, between 0.01 and 7500 ppm; alternatively, between 0.01 and 3,000 ppm, and alternatively between 100 and 6,000 ppm. In specific embodiments, the catalytic amount of the catalyst may range from 1000 to 6,000 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.01 to 3.0% by weight of the composition, alternatively, from 0.1 to 3.0% by weight of the composition, alternatively from 0.1 to 2.0% of the composition, alternatively from 0.1 to 1.5% of the composition.

Component (v) is a Cured Silicone Elastomer Powder

Any suitable cured silicone elastomer powder may be utilised. In one alternative, cured silicone elastomer powder (v) has an average particle size of from 0.01 to 100 μm, alternatively 0.01 to 50 μm, alternatively from 0.01 to 25 μm. They may contain chemically functional groups, e.g. epoxy groups (meth)acryloxy groups or may be coated e.g. with a silica treated coating.

The cured silicone elastomer powder is made from a suitable curable silicone composition. These may include, for example, addition (hydrosilylation) reaction-curing silicone compositions, condensation reaction-curing silicone compositions, organoperoxide-curing silicone compositions, and ultraviolet-curing silicone compositions. Addition reaction-curing and condensation reaction-curing silicone compositions are preferred for their ease of handling.

Silicone elastomer powders are generally prepared by making a homogeneous water-based emulsion of the curable silicone composition by first dispersing the curable silicone composition in water or an aqueous surfactant solution, and by then subjecting this dispersion to the action of an agitator such as a homogenizer, colloid mill, or a mixing device such as an ultrasonic vibrator. The water-based curable silicone emulsion is preferably prepared using surfactant to obtain a very stable emulsion in which the curable silicone composition has a small average particle diameter. A water-based dispersion of the cured silicone powder is then produced by curing the curable silicone present in the water-based emulsion. This cure may be affected by allowing said water-based emulsion to stand at room temperature or by heating the water-based emulsion. If heating the water-based curable silicone emulsion, the preferred heating temperature should not exceed 100° C., while particularly preferred temperatures fall in the range of 40° C. to 95° C. The techniques for heating the water-based curable silicone emulsion are by direct heating of the water-based emulsion or by adding the water-based emulsion to hot water. Commercial examples which may be utilised as component (v) include, for the sake of example, Dowsil™ 23N, Dowsil™ 603T additive and Dowsil™ 9701 Cosmetic Powder from Dow Silicones Corporation.

The cured silicone rubber powder is present in the composition in an amount of from 2.5 to 20 wt. % of the composition, alternatively from 2.5 to 15 wt. % of the composition, alternatively from 2.5. to 10 wt. % of the composition, i.e. when part A and part B are mixed together.

Component (vi)—Eco-Solvent

Component (vi) is an eco-solvent. Any suitable eco-solvent may be utilised, examples include isopentadecane, isohexadecane, isoheptadecane, isooctadecane, isononadecane and mixtures thereof or trimethyl terminated polydimethylsiloxane having a viscosity of from greater than or equal to (≥) 5 mPa·s at 25° C. to less than or equal to (≤) 100 mPa·s at 25° C. It has been noted that use of a trimethyl terminated polydimethylsiloxane having a viscosity of <5 mPa·s at 25° C. seems to result in a leather material which in fact does whiten in its stretch marks. In one embodiment the eco-solvent comprises or consists of isohexadecane. The eco-solvent is present in the composition as a means of diluting the composition and is present in the composition in an amount of from 30 to 70 wt. % of the composition.

Inhibitor

Optionally, to obtain a longer working time or pot life of the hydrosilylation curable silicone elastomer composition used in or as the leather coating composition because a hydrosilylation cure system is being utilised, a suitable inhibitor may be incorporated into the composition in order to retard or suppress the activity of the catalyst.

Inhibitors of platinum metal-based catalysts, generally a platinum metal-based catalyst is well known in the art. Hydrosilylation or addition-reaction inhibitors include hydrazines, triazoles, phosphines, mercaptans, organic nitrogen compounds, acetylenic alcohols, silylated acetylenic alcohols such as methyl (tris(1,1-dimethyl-2-propynyloxy)) silane, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (iv) will in some instances impart satisfactory storage stability and cure rate. In other instances, inhibitor concentrations of up to 500 moles of inhibitor per mole of the metal of catalyst (iv) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition. Mixtures of the above may also be used.

The composition as hereinbefore described does not contain any thermo-expandable microcapsules. Such thermo-expandable microcapsules comprise spherical shells composed of thermoplastic resin materials which hold volatile substances, typically liquids. Said thermo-expandable microcapsules are designed to expand when heated. The thermoplastic resin materials may include polyethylene, polystyrene, polyvinyl acetate, polyvinyl chloride, polyvinylidene chloride, polyacrylonitrile, polymethyl methacrylate, polybutadiene, polychloroprene, and other vinyl polymers and copolymers thereof; Nylon 6, Nylon 66, and other polyamides; and polyethylene terephthalate, polyacetal, and blends thereof. The volatile substances may for example comprise butane, isobutene, propane, and other hydrocarbons; methanol, ethanol, and other alcohols; dichloroethane, trichloroethane, trichloroethylene, and other halogenated hydrocarbons; and diethyl ether, isopropyl ether, and other ethers. enclosed in spherical shells composed of a thermoplastic resin. For the avoidance of doubt the eco-diluent (vi) is not provided as the volatile substance, i.e. liquid in thermo-expandable microcapsules.

Optional Additives

The composition may comprise one or more optional additives. One optional additive which may be utilised is a low viscosity polydiorganosiloxane polymer having at least one, alternatively at least two alkenyl and/or alkynyl groups per molecule and a viscosity of from 100 to 750 mPa·s measured at 25° C. relying on the cup/spindle method of ASTM D1084-16 Method B, using an appropriate spindle for the viscosity range unless otherwise indicated. The chemical structure of said low viscosity polydiorganosiloxane polymer is analogous to that of polydiorganosiloxane polymer(s) (i) with the exception of the lower viscosity and the fact that the content of alkenyl and/or alkynyl groups per molecule may be lower than in component (i), i.e. an alkenyl group and/or alkynyl group content of from 0.75% by weight of the polymer(s) per molecule (determined using quantitative infra-red analysis in accordance with ASTM E168). Examples include dialkylalkenyl terminated dialkylpolysiloxanes having a viscosity of from 100 to 750 mPa·s at 25° C., alternatively 150 to 500 mPa·s at 25° C. such as dimethylvinyl terminated polydimethylsiloxanes and copolymers thereof such as dimethylvinyl terminated dimethylmethylvinyl polysiloxane copolymer. When the low viscosity polydiorganosiloxane polymer as hereinbefore described is present, it may be used to partially replace some of component (i), but the cumulative total of component (i)+low viscosity polydiorganosiloxane polymer as hereinbefore described may be up to a maximum of 40% weight of the composition, alternatively up to 35% weight of the composition. Hence when component (i) and the low viscosity polydiorganosiloxane polymer are present the total combined amount is from 8, alternatively 10 wt. % of the composition, to 40 wt. % of the composition, alternatively 35 wt. % of the composition, alternatively 30 wt. % of the composition, alternatively 25 wt. % of the composition, for example the cumulative weight of organopolysiloxane polymer (i) and the low viscosity polydiorganosiloxane polymer (when present) may be present in a range of from 10 to 40 wt. %, alternatively from 10 to 35 wt. %.

Other Additives

Commonly used other additives may be present in the leather coating composition comprising a hydrosilylation curable silicone elastomer composition as and when required. Examples of these optional additives include non-reinforcing fillers, electrically conductive fillers, non-conductive filler, pot life extenders, flame retardants, pigments, colouring agents, chain extenders, heat stabilizers, compression set improvement additives, antisqueak agents, antifreeze agents and/or biocides and mixtures thereof.

Non-Reinforcing Filler

Non-reinforcing filler, when present, may comprise crushed quartz, diatomaceous earths, barium sulphate, iron oxide, titanium dioxide and carbon black, wollastonite and platelet type fillers such as, graphite, graphene, talc, mica, clay, sheet silicates, kaolin, montmorillonite and mixtures thereof. Other non-reinforcing fillers which might be used alone or in addition to the above include aluminite, calcium sulphate (anhydrite), gypsum, calcium sulphate, magnesium carbonate, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Non-reinforcing fillers when present may alternatively or additionally be selected from aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO;]$.

Suitable sheet silicates e.g. silicate minerals which may be utilised include but are not limited to mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. When present, the non-reinforcing filler(s) is/are present up to a cumulative total of from 1 to 50% wt. of the composition.

In one embodiment the non-reinforcing filler may include glass or the like micro beads or microspheres to enhance the thermal insulation of the material. The micro beads or microspheres may be glass e.g. for example borosilicate glass micro-beads and/or microspheres.

Whenever deemed necessary the non-reinforcing filler may also be treated as described above with respect to the reinforcing fillers (ii) to render them hydrophobic and thereby easier to handle and obtain a homogeneous mixture with the other components. As in the case of the reinforcing fillers (ii) surface treatment of the non-reinforcing fillers makes them easily wetted by polydiorganosiloxane polymer (i) and resin (v) when present which may result in improved properties of the compositions, such as better processability (e.g. lower viscosity, better mold releasing ability and/or less adhesive to processing equipment, such as two roll mill), heat resistance, and mechanical properties.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of non-conductive fillers include quartz powder, diatomaceous earth, talc, clay, mica, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The liquid curable silicone elastomer composition may thus be free of pot life extender.

Examples of flame retardants include aluminium trihydrate, magnesium hydroxide, calcium carbonate, zinc borate, wollastonite, mica and chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include carbon black, iron oxides, titanium dioxide, chromium oxide, bismuth vanadium oxide and mixtures or derivatives thereof.

Examples of colouring agents include vat dyes, reactive dyes, acid dyes, chrome dyes, disperse dyes, cationic dyes and mixtures thereof.

Examples of chain extenders include disiloxane or a low molecular weight polyorganosiloxane containing two silicon-bonded hydrogen atoms at the terminal positions. The chain extender typically reacts with the alkenyl groups and/or alkynyl groups of polydiorganosiloxane polymer (i), thereby linking two or more molecules of polydiorganosiloxane polymer (i) together and increasing its effective molecular weight and the distance between potential cross-linking sites.

A disiloxane is typically represented by the general formula $(HR^a_2Si)_2O$. When the chain extender is a polyorganosiloxane, it has terminal groups of the general formula $HR^a_2SiO_{1/2}$ and non-terminal groups of the formula $R^b_2SiO$. In these formulae, $R^a$ and $R^b$ individually represent unsubstituted or substituted monovalent hydrocarbon groups that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

Where the optional additives may be used for more than one reason e.g. as a non-reinforcing filler and flame retardant, when present they may function in both roles. When or if present, the aforementioned additional components are cumulatively present in an amount of from 0.1 to 30% wt, alternatively of from 0.1 to 20% wt based on the weight of the composition.

In order to prevent premature cure in storage, the composition will be stored prior to use in two-parts Part A and part B. Typically, part A will contain some of polydiorganosiloxane polymer (i) and reinforcing filler (ii) and hydrosilylation catalyst (iv) and part B will contain the remainder of polydiorganosiloxane polymer (i) and reinforcing filler (ii) together with components organohydrogenpolysiloxane (iii) and, if present, the inhibitor. The two-part composition may be designed to be mixed together in any suitable ratio, dependent on the amounts of polydiorganosiloxane polymer (i) and reinforcing filler (ii) in part B and as such can be mixed in a Part A:Part B weight ratio of from 15:1 to 1:2, but are preferably mixed in a Part A:Part B weight ratio of from 2:1 to 1:2, alternatively from 1.5:1 to 1:1.5, alternatively 1:1.

Optional additives may be introduced into the silicone elastomeric composition in either Part A or part B as required providing they do not cause a negative effect on any of the other ingredients in that respective part.

The individual parts of the hydrosilylation curable silicone elastomer composition used for the leather coating composition may be prepared in any way suitable. Any mixing techniques and devices described in the prior art can be used for this purpose. The particular device to be used will be determined dependent on the viscosities of components and the final curable coating composition. Suitable mixers include but are not limited to paddle type mixers e.g. planetary mixers and kneader type mixers. Cooling of components during mixing may be desirable to avoid premature curing of the composition.

As previously discussed, component (ii) the reinforcing filler may be introduced into the composition in the form of a fumed silica masterbatch used to introduce fumed silica into both part A or Part B of the composition may comprise from 25 to 40 wt. % of fumed silica and from 55 to 75 wt. % of polydiorganosiloxane containing at least 2 alkenyl and/or alkynyl groups per molecule. The polydiorganosiloxane may be component (i) above and/or a polydiorganosiloxane in the same viscosity range as component (i) but having an alkenyl and/or alkynyl content of <5 wt. % of the polymer. In one embodiment the polydiorganosiloxane containing at least 2 alkenyl and/or alkynyl groups per molecule in the fumed silica masterbatch is a dimethylvinyl terminated polydimethylsiloxane having a viscosity of between 50,000 and 80,000 mPa·s at 25° C. and a vinyl content of from 0.05 to 0.2 wt. % of the polymer, alternatively a vinyl content of from 0.05 to 0.15 wt. % of the polymer determined using quantitative infra-red analysis in accordance with ASTM E168. Such a masterbatch may comprise just the fumed silica and polymer but may optionally also contain small amounts of other ingredients such as hexamethyldisiloxane, divinyltetramethyldisiloxane, dimethylhydroxy terminated methylvinyl siloxane polymer having a viscosity of 10 to 100 mPa·s and a vinyl content of 5 to 20 wt. %, alternatively 7.5 to 15 wt. % of said polymer (determined using quantitative infra-red analysis in accordance with ASTM E168); and/or water.

Hence, when Part A and Part B are mixed together in a 1:1 weight ratio, a Part A composition in accordance with the present disclosure may comprise:

Component (i), one or more polydiorganosiloxane polymer(s) having a viscosity of from 1000 to 500,000 mPa·s at 25° C., alternatively, a viscosity of from 1000 mPa·s to 150,000 mPa·s at 25° C., alternatively from 2000 mPa·s to 125,000 mPa·s, alternatively from 2000 mPa·s to 100,000 mPa·s at 25° C., alternatively from 5000 mPa·s to 80,000 mPa·s at 25° C. and an alkenyl group and/or alkynyl groups content of at least 5% by weight of the polymer(s) per molecule typically vinyl groups and as previously indicated are present on the polymer in an amount of at least 5% by weight of the polymer(s) per molecule, alternatively from 5 to 15% by weight of the polymer(s) per molecule, alternatively from 6 to 15% by weight of the polymer(s) per molecule, alternatively from 7 to 15% by weight of the polymer(s) per molecule, which may be determined using quantitative infra-red analysis in accordance with ASTM E168; component (i) is present in an amount of from 3 wt. %, of the Part A composition, alternatively from 10 wt. %, of the Part A composition, alternatively from 20 wt. %, of the Part A composition to 60 wt. %, of the Part A composition, alternatively 50 wt. %, of the Part A composition, for example the composition may comprise component (i) in an amount of from 20 to 60% wt. % of the Part A composition, alternatively from 20 to 50 wt. % of the Part A composition;

Component (ii) is a reinforcing filler, i.e. a fumed silica which may be introduced directly into the composition or may be introduced in the form of a masterbatch. When in the form of a masterbatch, the masterbatch may comprise from 25 to 40 wt. % of fumed silica and from 55 to 75 wt. % of component (i) and/or a dimethylvinyl terminated polydimethylsiloxane having a viscosity of between 50,000 and 80,000 mPa·s at 25° C. and a vinyl content of from 0.05 to 0.2 wt. % of the polymer, alternatively a vinyl content of from 0.05 to 0.15 wt. % of the polymer; alternatively 55 to 75 wt. % of a dimethylvinyl terminated polydimethylsiloxane as described above. The masterbatch composition may also initially include treating agents for the in situ treating of the filler to render it hydrophobic and therefore easier to mix with the polymer. When introduced as a fumed silica masterbatch the masterbatch may be present in an amount of from 5 to 30 wt. % of the Part A composition, alternatively from 5 to 20 wt. % of the Part A composition, alternatively from 6 to 15 wt. % of the Part A composition.

Component (iv) a hydrosilylation catalyst composition provided the amount of catalyst present will be within the range of from 0.01 to 3.0% by weight of the composition, alternatively, from 0.1 to 3.0% by weight of the composition, alternatively from 0.1 to 2.0% of the composition, alternatively from 0.1 to 1.5% of the composition and containing from between 0.01 ppm, and 10,000 parts by weight of platinum-group metal, per million parts (ppm), based on the combined weight of the components (i) and (ii) and (v) when present; alternatively, between 0.01 and 7500 ppm; alternatively, between 0.01 and 3,000 ppm, and alternatively between 100 and 6,000 ppm; Component (v) a cured silicone powder in an amount of from 5 to 30 wt. % of the composition, alternatively from 5 to 20 wt. % of the Part A composition; and Component (vi) an eco-diluent in an amount of from 25 to 75% by wt. of the part A composition.

When part A is as described above in a 1:1 weight ratio with part B, Part B may comprise:

Component (ii) a fumed silica masterbatch comprising from 25 to 40 wt. % of fumed silica and from 55 to 75 wt. % of component (i) and/or a dimethylvinyl terminated polydimethylsiloxane having a viscosity of between 50,000 and 80,000 mPa·s at 25° C. and a vinyl content of from 0.05 to 0.2 wt. % of the polymer, alternatively a vinyl content of from 0.05 to 0.15 wt. % of the polymer; alternatively 55 to 75 wt. % of a dimethylvinyl terminated polydimethylsiloxane as described above. When introduced as a fumed silica masterbatch in Part B, the masterbatch may be present in an amount of from 20 wt. % of the Part B composition, alternatively from 25 wt. % of the Part B composition, alternatively from 30 wt. % of the Part B composition, to 60 wt. % of Part B composition, alternatively to 50 wt. % of the Part B composition, alternatively to 45 wt. % of the Part B composition, for example in a range of from 20 to 60 wt. % of the Part B composition, alternatively from 20 to 50 wt. % of the Part B composition, alternatively from 20 to 45 wt. % of the Part B composition, alternatively from 30 to 50 wt. % of the Part B composition, alternatively from 25 to 45 wt. % of the Part B composition.

Component (iii) a silicone resin cross-linker having terminal groups comprising silicone bonded hydrogen, containing at least 5,000 parts per million (ppm) of silicon bonded hydrogen (Si—H), alternatively at least 7000 ppm, alternatively from 7000 to 12,000 ppm of silicon bonded hydrogen, alternatively 8000 ppm to 11,000 ppm of silicon bonded hydrogen, present in the total composition in an amount of from 10 to 30 weight %, alternatively from 10 to 20 weight % by weight of the Part B composition, alternatively from 12 to 20 weight % by weight of the Part B composition but the amount present is typically determined by the molar ratio of the silicon-bonded hydrogen atoms in component (iii) to the total number of all unsaturated groups, the viscosity of component (iii) is from 15 to 50 mPa·s at 25° C., alternatively from 15 to 40 mPa·s at 25° C., alternatively from 20 to 35 mPa·s at 25° C.; and Component (vi) an eco-diluent in an amount of from 25 to 75% by wt. of the Part B composition. When present in the composition the cure inhibitor will usually be added to Part B to keep it apart from the catalyst. When present the inhibitor is present in an amount of from 0.005 to 15% by weight of the Part B composition alternatively present in an amount of from 0.0125 to 10% by weight of the Part B composition.

The order for mixing components in the hydrosilylation curable silicone elastomer composition of the leather coating composition is not critical. Suitable parts A and B are prepared and then part A and part B are mixed together in a 1:1 ratio shortly prior to use. It will be appreciated that for all compositions the total weight % is 100 weight %.

Curing of the hydrosilylation curable silicone elastomer composition of the leather coating composition may be carried out at a suitable temperature for hydrosilylation cure. For example, a cure temperature of from about 80° C. to 180° C., alternatively from 80° C. to 150° C., alternatively of from 80° C. to 130° C.

The coating composition as described is utilised as a topcoat for synthetic leather materials, particularly synthetic silicone leather materials, because once cured it provides outstanding abrasion and scratch resistance protection. The leather coating composition may also be applied to various other types of leather, for example conventional leather, nubuck or suede. The leather coating composition as hereinbefore described may be applied to finished leather or during the final wet stage in finishing leather but is preferably used as a topcoat for synthetic leather, particularly silicone-based synthetic leathers. Leather having a topcoat in the form of a reaction product from the cure of the leather coating composition described above has a greatly increased abrasion resistance. This increase in abrasion resistance is achieved without detriment to the compatibility and the flexibility of the final coating; other additives often used to increase abrasion resistance may harshen the touch of the coated leather and increase resistance to bending, causing cracks in the structure of the coating.

BRIEF DESCRIPTION OF THE DRAWINGS

The application and uses of the leather coating composition as hereinbefore described will be more apparent from the following further description taken in conjunction with the accompanying Figures in which.

Figure 1:
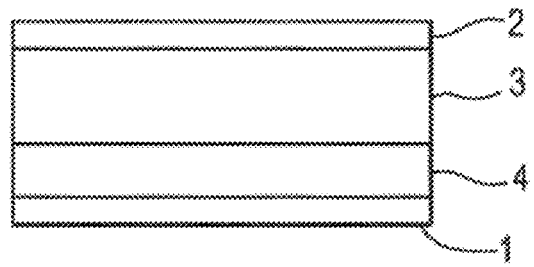
FIGS. 1-4 are cross-sectional views showing the layers in the structure of a silicone based synthetic leather material during or post manufacture.

DETAILED DESCRIPTION OF THE METHODS OF MAKING A SILICONE-BASED SYNTHETIC LEATHER USING THE COMPOSITION AS HEREINBEFORE DESCRIBED IN CONJUNCTION WITH THE AFOREMENTIONED FIGURES

A silicone-based synthetic leather comprising a coating which is the reaction product from the cure of the leather coating composition (5) as hereinbefore described, may comprise several layers of cured liquid silicone rubber (3,4) each having a different function as well as a textile support layer (2). Excluding the topcoat which is made from the leather coating composition described, a synthetic silicone leather comprises at least a textile support layer (2), an adhesive layer made from a first liquid silicone rubber material (3) and a second or skin layer (4) made from a second liquid silicone rubber material. The adhesive layer (3) is provided as an effective adhesive between the textile support (2) and the second (skin) layer (4). In use the adhesive or first layer (3) is adhered to the textile support layer (2) and adhered or laminated to the skin layer (4). The leather coating composition as hereinbefore described functions as a protective topcoat (5) which is a third layer on top of and bound to the skin layer (4), i.e. the second layer (4) is situated between the adhesive layer (3) and the topcoat layer (5).

The textile support layer (2) may be made from any suitable textile material for example woven, knitted or non-woven textiles made from synthetic resin fibers, natural fibers and/or, microfibers. These may include but are not restricted to polyester fiber, a viscose rayon fiber, a polyamide fiber, nylon, an acrylic fiber, a polyolefin fiber; cellulose fibers such as cotton; and elastic textile materials, such as spandex, may be used as may mixtures of any two or more of the above. The textile support layer is designed to enhance mechanical strength of silicone leather.

The coating composition as hereinbefore described is designed as a protective synthetic leather topcoat. It may be applied to any silicone-based synthetic leather. Any suitable liquid silicone rubber composition may be utilised as the adhesive or first layer (3). This must be able to adhere to the textile support layer (2) and typically once cured has a low durometer Shore A hardness e.g. between 20 and 40 and a soft hand feeling to the touch. A commercial example of a suitable hydrosilylation curable liquid silicone rubber composition designed to function as the adhesive layer (3) is Dowsil™ LCF 8400 Binder, from Dow Silicones Corporation. Dowsil™ LCF 8400 Binder is provided to the customer in a two-part form as is standard for a hydrosilylation curable composition to avoid premature cure and as such the two-parts of Dowsil™ LCF 8400 Binder are mixed together immediately prior to use.

As previously indicated the first or adhesive layer (3) is designed to be sandwiched between and to adhere the textile support (2) to the second or skin coating layer (4).

The second or skin coating composition (4) as hereinbefore described is designed as a protective synthetic leather which is usually bonded to adhesive layer (3). and may be used alone or with a suitable topcoat (5) such as the one described herein. Any suitable liquid silicone rubber composition may be utilised to form the second or skin layer (4) which typically once cured has a larger durometer Shore A hardness than the first or adhesive layer (3) e.g. greater than or equal to (≥) 50, alternatively, greater than or equal to (≥) 60. Commercial examples of suitable liquid silicone rubber compositions curable to function as the second or skin layer (4) are Dowsil™ LCF 8300 Skin and Dowsil™ LCF 8500 Skin both from Dow Silicones Corporation, which given they are both hydrosilylation curable liquid silicone rubber compositions are again provided to the user in two-parts which are mixed together immediately prior to use to avoid premature cure in storage prior to use. Dowsil™ LCF 8300 Skin and Dowsil™ LCF 8500 Skin has a high shore A durometer value of about 65 and provides abrasion resistance and has compared to Dowsil™ LCF 8500 Skin a relatively low viscosity. The latter is much higher viscosity as it is a fumed silica reinforced version of the former having high mechanical strength. Often a mixture of Dowsil™ LCF 8300 Skin and Dowsil™ LCF 8500 Skin is used as the second or skin layer (4) to benefit from the advantages of both compositions.

Figure 2:
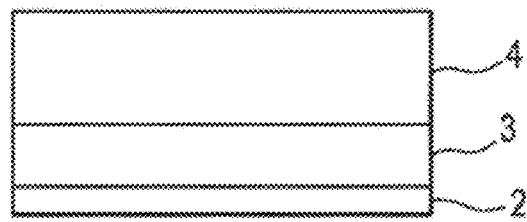

The leather coating composition as hereinbefore described may be applied as a topcoat on a preformed silicone-based synthetic leather material e.g. (2, 3, 4) as shown in FIG. 2 by any suitable coating method e.g. spraying, rolling, brushing, spin coating, dip coating, solvent casting, slot die coating, spray coating, knife coating, or gravure coating.

In such circumstances the preformed silicone-based synthetic leather material has typically been prepared by
 (i) applying a liquid silicone rubber skin type composition (4) onto a release paper (1),
 (ii) curing the skin layer composition in (i) on the release paper (1) to form a cured skin layer (4);
 (iii) applying a silicone adhesive composition onto the cured skin layer (4),
 (iv) placing a textile support layer (2) on top of the adhesive layer (3) prior to or during cure of adhesive layer (3), such that the adhesive layer (3) is sandwiched between the skin layer (4) and the textile support layer (2);
 (v) curing the adhesive layer (3); and
 (vi) removing the release paper (1) as required.

The above is depicted in FIGS. 1 and 2 which depict a silicone-based synthetic leather material with the release layer present (FIG. 1) and without the release layer (FIG. 2). In the case of FIG. 2 the silicone-based synthetic leather material has been prepared and is now ready for application of the topcoat as hereinbefore described by any suitable application means (e.g. spraying, rolling, brushing, spin coating, dip coating, solvent casting, slot die coating, spray coating, knife coating, or gravure coating) as described above on top of the skin layer (4).

The leather coating composition as hereinbefore described is then applied on to the surface of the skin layer (4) from which the release paper (1) has been removed and is cured to form a protective topcoat on the silicone-based synthetic leather material. The leather coating composition is, for example, applied at a wet film thickness of 10 to 100 μm, alternatively 10 to 60 μm corresponding to a dry film thickness of about 2 to 50 μm, alternatively 2 to 30 μm alternatively 5 to 25 μm.

Following application of the leather coating composition, curing is carried out by heating the coated material at a temperature of from about 80° C. to 180° C., alternatively from 80° C. to 150° C., alternatively of from 80° C. to 130° C. for about 1 to 20 minutes to cure the leather coating composition thereon. When the curing temperature is low, curing takes a relatively longer time; when the curing temperature is too high, the fabric base may undergo deterioration due to the heat. Hence, a curing temperature of from 80 to 150° C., alternatively 80° C. to 130° C. is preferred.

In an alternative embodiment a silicone-based synthetic leather may be prepared in a continuous process with a topcoat using the leather coating composition as hereinbefore described in the continuous process. In this case the process followed may be:
 (i) applying the leather coating composition as hereinbefore described on to a release paper (1),
 (ii) curing the leather coating composition as hereinbefore described on the release paper (1) to form a cured topcoat (5);
 (iii) applying a silicone skin layer on top of the cured topcoat (5);
 (iv) curing the silicone skin layer to form a cured skin layer (4) such that the cured topcoat layer (5) is sandwiched between the release paper (1) and the cured skin layer (4);
 (v) applying a silicone adhesive composition onto the cured skin layer (4),
 (vi) placing or laminating a textile support layer (2) on top of the uncured or curing adhesive layer (3); preferably the textile support layer is effectively laminated to the adhesive layer.
 (vii) curing the adhesive layer (3) such that post-cure the adhesive layer (3) is sandwiched between the skin layer (4) and the textile support layer (2); and
 (viii) removing the release paper (1) as required.

Figure 3:
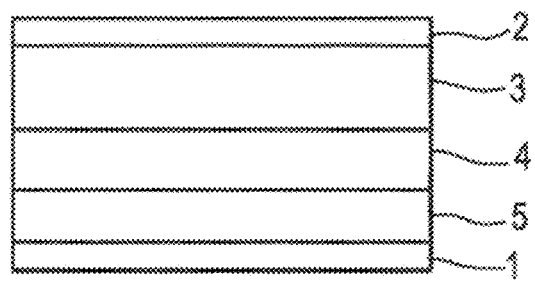
Figure 4:
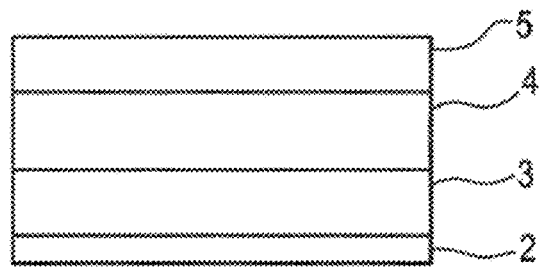

The different layers for such a process are depicted in FIGS. 3 and 4, wherein FIG. 3 depicts the release layer (1) present and FIG. 4 depicts the final silicone-based synthetic leather material with the release paper removed.

Any suitable release paper may be used for example super matting release paper ARX175DM from the Japan Asahi company. Each cure step may take place in a suitable oven, e.g. by curing and drying in a hot-air oven or may be undertaken in a conveyor oven in the case of a continuous process.

The topcoat layer (5) as hereinbefore described is typically applied on to the release paper (1) with a wet film thickness of 10 to 100 μm, alternatively 10 to 60 μm corresponding to a dry coating thickness of about 2 to 50 μm, alternatively 2 to 30 μm alternatively 5 to 25 μm. It can be cured at any suitable temperature, for example at about 80° C. to 180° C., alternatively from 80° C. to 150° C., alternatively of from 80° C. to 130° C. for a period of from 30 seconds to 5 minutes, alternatively 30 seconds to 2.5 minutes.

The skin coat layer (4) is typically from 0.05 to 1 mm thick after cure, alternatively 0.05 to 0.8 mm thick, alternatively 0.1 to 0.4 mm thick. It can be cured at any suitable temperature, for example at 100 to 150° C., alternatively 110 to 135° C., alternatively 110 to 125° C. for a period of from 30 seconds to 5 minutes, alternatively 30 seconds to 2.5 minutes.

The adhesive coat layer (3) is typically from 0.05 to 1 mm thick after cure, alternatively 0.1 to 0.75 mm thick. It can be cured at any suitable temperature, for example at 125 to 180° C., alternatively 130 to 170° C., alternatively 135 to 160° C. for a period of from 1.5 minutes to 5 minutes, alternatively 1.5 minutes to 4 minutes.

The above processes depict the preparation of a silicone based synthetic leather material. The reader may appreciate that should the need arise additional layers may be introduced into the material if desired.

Synthetic leathers, particularly silicone-based synthetic leathers may be designed to have a wide variety of properties given the content of the different layers, e.g. they may have excellent flame retardancy, smoke density, heat resistance, contamination resistance, solvent resistance, hydrolysis resistance, and the like as required for the end use of the leather. End uses envisaged include but are not limited to furniture, decoration, handbags, luggage, garments, footwear, car interiors, medical beds/seats and the like.

EXAMPLES

In the following examples the coating composition and several comparatives are tested to show the advantage the coating herein described with respect to provide sufficient abrasion resistance (e.g. a Wyzenbeek abrasion resistance of greater than or equal to (≥) 75,000, alternatively greater than or equal to (≥) 100,000 times test), as well as suitable scratch resistance i.e. no white line or crack after strong nail scratching and no whitening caused by stretching. All viscosities are measured at 25° C. relying on the cup/spindle method of ASTM D1084-16 Method B, using an appropriate spindle for the viscosity range unless otherwise indicated. Alkenyl and/or alkynyl content and Si—H content was determined using quantitative infra-red analysis in accordance with ASTM E168.

The ingredients used in the leather coating composition used in the following examples are defined in Table 1 below

TABLE 1

| Names used in Tables | Detailed Description |
|---|---|
| Vinyl-term PDMS polymer | Dimethylvinyl terminated polydimethylsiloxane having a viscosity of 65,000 mPa · s at 25° C. having a vinyl content of about 0.08 wt. % |
| High vinyl PDMS polymer | dimethylvinyl terminated dimethylmethylvinyl polysiloxane copolymer having a viscosity of 15,000 mPa · s at 25° C. and a vinyl content of about 8.0 wt. % |
| Low viscosity vinyl PDMS polymer | dimethylvinyl terminated dimethylmethylvinyl polysiloxane copolymer having a viscosity of 300 mPa · s at 25° C. and a vinyl content of about 1.15 wt. % |
| Fumed silica | HDK ® T30P pyrogenic silica (Wacker Chimie) having a BET surface area of 300 m²/g |
| HMDS | hexamethyldisilazane |
| MVD (Methylvinyl diol) | Dimethylhydroxy terminated polydimethylmethylvinylsiloxane having a viscosity of about 30 mPa · s at 25° C. and a vinyl content of about 12.0 wt. % |
| Divinyltetramethyldisilazane | |
| Platinum catalyst | Platinum catalyst in a solution of polydimethylsiloxane having about 5000 ppm of platinum metal with respect to the rest of the composition |
| Inhibitor | Methyl(tris(1,1-dimethyl-2-propynyloxy))silane |
| Silicone elastomer powder | Dowsil ® 23N (Dow Silicones Corporation) |
| Resinous SiH crosslinker containing M(H) functions | Si-H dimethyl terminated resinous Si-H polysiloxane copolymer having a viscosity of 25 mPa · s at 25° C. and a silicon bonded hydrogen content of about 9,000 ppm |
| Isohexadecane | |
| Trimethylsiloxy terminated SiH cross linker | Trimethyl terminated dimethylmethylSi-H polysiloxane copolymer having a viscosity of 30 mPa · s at 25° C. and a silicon bonded hydrogen content of about 16,000 ppm |
| Low viscosity silicone fluid | trimethyl terminated polydimethylsiloxane having a viscosity of 1 mPa · s at 25° C. |

Table 2 provides details of the starting materials used for the silica masterbatch in the composition described below. The fumed silica was mixed with the vinyl-term PDMS polymer in the presence of the small molecules which acted as hydrophobing treating agents of the silica resulting in the in-situ treatment of the silica whilst the silica and polymer are being mixed. As previously indicated the polymer used may be component (i) or a mixture of component (i) and another polymer if desired but in this case no component (i) is present in the masterbatch.

TABLE 2

Fumed Silica Masterbatch

| | Wt. % |
|---|---|
| Fumed silica | 29.7% |
| Vinyl-term PDMS polymer | 62.4% |
| HMDS | 5.5% |
| Divinyl teteramethyldisilazane | 0.3% |
| Methylvinyl diol (MVD)* | 0.35% |
| Water | 1.75% |

Several LSR compositions were prepared as examples and comparative examples in two-part compositions. The Part A compositions are depicted in Table 3a and the Part B compositions are depicted in Table 3b. Shortly prior to use the Part A compositions and their respective part B compositions were mixed together in a 1:1 weight ratio to make the final composition under test.

TABLE 3a

Part A compositions

| | Ex. 1 (wt. %) | Ex. 2 (wt. %) | Ex. 3 (wt. %) | Comp. 1 (wt. %) | Comp. 2 (wt. %) | Comp. 3 (wt. %) | Comp. 4 (wt. %) |
|---|---|---|---|---|---|---|---|
| Fumed silica LSR master batch (29.7% silica) | 8.00 | 12.00 | 10.94 | 21.37 | 30.69 | 12.00 | 6.00 |
| Vinyl-term PDMS polymer | | | | | | | 6.00 |
| High vinyl PDMS polymer | 22.69 | 34.05 | 5 | 28.31 | | 34.05 | 34.05 |
| Low viscosity vinyl PDMS polymer | | | 21.48 | | | | |
| MVD | | | 5.3 | | | | |
| Silicone elastomer powder | 14.05 | 13.57 | 7.05 | | 9.05 | 13.57 | 13.57 |
| Isohexadecane | 55.00 | 40.00 | 50.00 | 50.00 | 60.00 | | |
| Low viscosity silicone fluid | | | | | | 40.00 | 40.00 |
| Platinum catalyst solution | 0.26 | 0.38 | 0.26 | 0.32 | 0.26 | 0.38 | 0.38 |

TABLE 3b

Part B compositions

| | Ex.1 (wt. %) | Ex. 2 (wt. %) | Ex. 3 (wt. %) | Comp. 1 (wt. %) | Comp. 2 (wt. %) | Comp. 3 (wt. %) | Comp. 4 (wt. %) |
|---|---|---|---|---|---|---|---|
| Fumed silica LSR master batch (29.7% silica) | 26.88 | 40.32 | 24.31 | 33.60 | 26.88 | 40.32 | 20.32 |
| Vinyl-term PDMS polymer | | | | | | | 20.00 |
| Low viscosity vinyl PDMS polymer | | | 12.57 | | | | |
| Isohexadecane | 60.00 | 40.00 | 50.00 | 50.00 | 60.00 | | |
| Low viscosity silicone fluid | | | | | | 40.00 | 40.00 |
| Inhibitor | 0.08 | 0.12 | 0.08 | 0.10 | 0.08 | 0.12 | 0.12 |
| Resinous SiH crosslinker containing M(H) functions | 13.04 | 19.56 | 13.04 | 16.3 | | 19.56 | 19.56 |
| Trimethyl-siloxy terminated SiH cross linker | | | | | 13.04 | | |

When the Part A and Part B compositions were mixed together in their respective compositions the final compositions, the wt. % levels of fumed silica, high vinyl polymer, and resinous cross-linker are shown in Table 3c below after evaporation of eco-solvent.

TABLE 3c key ingredients in dry topcoat layer after cure and evaporation of eco-solvent

| | Ex.1 (wt. %) | Ex. 2 (wt. %) | Ex. 3 (wt. %) | Comp. 1 (wt. %) | Comp. 2 (wt. %) | Comp. 3 (wt. %) | Comp. 4 (wt. %) |
|---|---|---|---|---|---|---|---|
| Fumed silica dosage | 12.41 | 12.95 | 10.46 | 16.32 | 21.3 | 12.95 | 6.51 |
| High vinyl PDMS polymer | 27.17 | 28.37 | 5.00 | 28.37 | 0 | 28.37 | 28.37 |
| Low viscosity vinyl PDMS polymer | | | 17.02 | | | | |
| Silicone elastomer powder | 16.82 | 11.31 | 7.05 | 0 | 11.31 | 11.31 | 11.31 |
| Resinous SiH crosslinker containing M(H) functions | 15.62 | 16.30 | 13.04 | 16.30 | 0 | 16.30 | 16.30 |
| Trimethyl-siloxy terminated SiH cross-linker | | | | | 16.30 | | |

A silicone-based synthetic leather having a topcoat using the compositions in Tables 3a and 3b was prepared in a continuous mode in the manner shown in FIGS. 3 and 4 herein. In this case a topcoat composition as depicted in Tables 3a and 3b was mixed and applied onto a continuous release paper (super matting release paper ARX175DM from Japan Asahi Company) in a dry film thickness of between 10-15 μm. Once applied on to the release paper the topcoat (5) was cured at a temperature of 120° C. for 1.0-1.5 minutes. A skin layer was then applied on top of topcoat (5). The skin layer (4) was a mixture of are Dowsil™ LCF 8300 Skin and Dowsil™ LCF 8500 Skin and was the mixture was applied to a thickness of 0.12-0.25 mm and subsequently cured at 120° C. for 1.5 minutes. An adhesive layer (3), in the form of Dowsil™ LCF 8400 Binder was then applied on skin layer (4) at a thickness of 0.12-0.25 mm and before curing this underwent a lamination bonding process to a microfiber-based textile layer (2) which combination was then cured at a temperature of 150° C. for a period of three minutes. After removing the release paper (1) as required, the final silicone-based synthetic leather samples were additionally post-cured at a temperature of 80° C. for 16-20 hours or 150° C. for 2-3 hours.

Physical Testing

The samples prepared performance tested using the Wyzenbeek abrasion test is used to measure the silicone leather's ability to withstand abrasion according to ASTM D4157-13. The scratch resistance test is used to measure scratch resistant ability of silicone leather per Ford BN 108-13 (for this technique, the observer uses a controlled light source to visually inspect each scratch line and rates according to a Rating Scale 1 to 5 (1=no scratch line at all; 5=severe scratch line). The whitening discolouration on stretch marks was observed by using thumb to stretch the samples of synthetic silicone leather analysed. The results are depicted in Table 4 below.

TABLE 4

Performance Testing

| | Ex.1 (wt. %) | Ex. 2 (wt. %) | Ex. 3 (wt. %) | Comp. 1 (wt. %) | Comp. 2 (wt. %) | Comp. 3 (wt. %) | Comp. 4 (wt. %) |
|---|---|---|---|---|---|---|---|
| Wyzenbeek abrasion test (Pass 100,000 times?) | Pass | Pass | Pass | Fail | Fail | Pass | Pass |
| Scratch resistance test | 1~2 | 1~2 | 1~2 | 1~2 | 1 | 1~2 | 4~5 |
| Stretching whitening (Yes/No?) | No | No | No | No | No | Yes | Yes |

TABLE 4-continued

Performance Testing

|  | Ex.1 (wt. %) | Ex. 2 (wt. %) | Ex. 3 (wt. %) | Comp. 1 (wt. %) | Comp. 2 (wt. %) | Comp. 3 (wt. %) | Comp. 4 (wt. %) |
|---|---|---|---|---|---|---|---|
| Repeated use of structure release paper (Times) | >15 | >15 | >15 | >15 | 2~3 | >15 | >15 |

Figure 5:
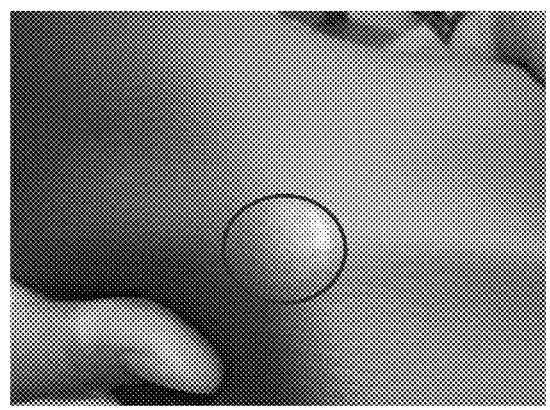
FIG. 5 is an image showing the "whitening" stretch marks caused by stretching a silicone based synthetic leather when after using solvents like trimethyl terminated polydimethylsiloxane having a viscosity of about 1 mPa·s at 25° C.
Figure 6:
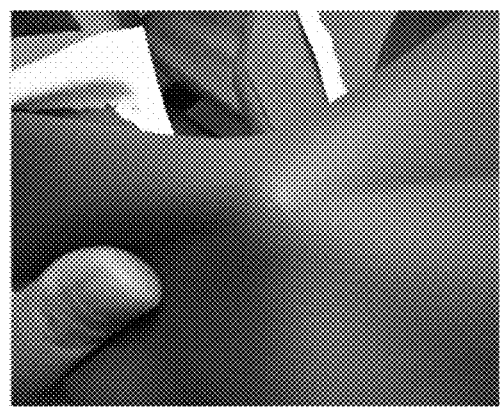
FIG. 6 is an image showing the non-appearance of "whitening" stretch marks caused when stretching a silicone based synthetic leather having a coating resulting from the cure of the preceding leather coating composition as a topcoat in accordance with an embodiment herein.

Examples 1, 2 and 3 passed both the Wyzenbeek abrasion test and the stretching/whitening test and therefore show an optimum performance. Comparative examples 1 and 2 were seen to fail the Wyzenbeek abrasion test despite passing the stretching/whitening test and as such were not suitable. Comparative examples 3 and 4 were also not deemed suitable for use but for a different reason, they passed the Wyzenbeek abrasion test but failed the stretching/whitening test. FIG. 5 shows the leather product coated with the cured product of the composition of comparative example 3 in which whitening is seen upon stretching (having used a trimethyl terminated polydimethylsiloxane with a viscosity of 1 mPa·s at 25° C.) whilst when the composition of example 1 herein was used using isohexadecane as the eco-solvent in the leather coating composition no discoloration was visualized as shown in FIG. 6.

What is claimed is:

1. A leather coating composition comprising a hydrosilylation curable silicone elastomer composition comprising:
   (i) one or more polydiorganosiloxane polymer(s) having a viscosity of from 1000 to 500,000 mPa·s at 25° C. and an alkenyl group and/or alkynyl group content of at least 5% by weight of the polymer(s) per molecule;
   (ii) a reinforcing filler;
   (iii) a silicone resin cross-linker having terminal groups comprising silicone bonded hydrogen;
   (iv) a hydrosilylation catalyst;
   (v) a cured silicone powder; and
   (vi) an eco-diluent selected from the group of isopentadecane, isohexadecane, isoheptadecane, isooctadecane, isononadecane, a trimethyl terminated polydimethylsiloxane having a viscosity of from 5 to 100 mPa·s at 25° C., and combinations thereof.

2. The leather coating composition in accordance with claim 1, wherein the silicone resin cross-linker (iii) comprises one or more of the following:
   silicone resins comprising or consisting of Si—H containing M groups, $(CH_3)_3SiO_{1/2}$ groups and $SiO_{4/2}$ groups,
   silicone resins comprising or consisting of Si—H containing M groups and $SiO_{4/2}$ groups,
   silicone resins comprising or consisting of Si—H containing M groups, $(CH_3)_2SiO_{2/2}$ groups and $SiO_{4/2}$ groups,
   silicone resins comprising or consisting of Si—H containing M groups, $SiO_{4/2}$ groups and $(C_6H_5)_3SiO_{1/2}$ groups, and
   alternatives in which methyl is replaced by phenyl groups or other alkyl groups or mixtures thereof, and
   wherein each of the above optionally includes one or more T groups.

3. The leather coating composition in accordance with claim 1, wherein the cured silicone elastomer powder (v) has an average particle size of from 0.01 to 100 μm.

4. The leather coating composition in accordance with claim 1, wherein the eco-solvent (vi) comprises or consists of isohexadecane.

5. The leather coating composition in accordance with claim 1, further comprising one or more additives selected from the group consisting of one or more low viscosity polydiorganosiloxane polymers having at least one, optionally at least two alkenyl and/or alkynyl group(s) per molecule and a viscosity of from 100 to 750 mPa·s at 25° C., inhibitors, non-reinforcing fillers, electrically conductive fillers, non-conductive fillers, pot life extenders, flame retardants, pigments, colouring agents, chain extenders, heat stabilizers, compression set improvement additives, anti-squeak agents, anti-freeze agents, and/or biocides.

6. The leather coating composition in accordance with claim 1, further defined as a topcoat composition for a silicone-based synthetic leather.

7. A silicone-based synthetic leather comprising a topcoat which is the reaction product of the topcoat composition in accordance with claim 6 obtained upon cure.

8. The silicone-based synthetic leather in accordance with claim 7, comprising a textile support layer selected from one or more of a polyester fiber, a viscose rayon fiber, a polyamide fiber, nylon, an acrylic fiber, a polyolefin fiber, cellulose fibers, and elastic textile materials.

9. The silicone-based synthetic leather in accordance with claim 7, wherein the topcoat has a Wyzenbeek abrasion resistance of greater than or equal to 75,000 in accordance with ASTM D4157-13.

10. A method of applying a silicone-based synthetic leather with the topcoat composition in accordance with claim 6 by one or more of the following: spraying, rolling, brushing, spin coating, dip coating, solvent casting, slot die coating, spray coating, knife coating, or gravure coating.

11. A method of applying a silicone-based synthetic leather with a topcoat composition, the method comprising:
   (i) applying the leather coating composition in accordance with claim 1 on to a release paper;
   (ii) curing the coating composition on the release paper to form a cured topcoat;
   (iii) applying a silicone skin layer on top of the cured topcoat;
   (iv) curing the silicone skin layer to form a cured skin layer such that the cured topcoat layer is sandwiched between the release paper and the cured skin layer;
   (v) applying a silicone adhesive composition onto the cured skin layer to form an adhesive layer;
   (vi) placing a textile support layer on top of the adhesive layer such that the adhesive layer is sandwiched between the skin layer and the textile support layer;
   (vii) curing the adhesive layer; and
   (viii) removing the release paper.

12. The silicone-based synthetic leather in accordance with claim 7, in or for furniture, decoration, handbags, luggage, garments, footwear, car interiors, or medical beds/seats.

13. The leather coating composition in accordance with claim 1,
   wherein the reinforcing filler (ii) is treated with at least one filler treating agent.

14. The silicone-based synthetic leather in accordance with claim 8, wherein the topcoat has a Wyzenbeek abrasion resistance of greater than or equal to 75,000 in accordance with ASTM D4157-13.

* * * * *